(12) United States Patent
Mayfield et al.

(10) Patent No.: US 8,786,189 B2
(45) Date of Patent: Jul. 22, 2014

(54) INTEGRATED EXIT SIGNS AND MONITORING SYSTEM

(76) Inventors: Jerrold W. Mayfield, Georgetown, TX (US); George Kasee, Austin, TX (US); Jason Foringer, Austin, TX (US); Sameul Kim, Austin, TX (US)

( * ) Notice: Subject to any disclaimer, the term of this patent is extended or adjusted under 35 U.S.C. 154(b) by 138 days.

(21) Appl. No.: 13/299,588

(22) Filed: Nov. 18, 2011

(65) Prior Publication Data

US 2012/0126700 A1    May 24, 2012

Related U.S. Application Data

(60) Provisional application No. 61/415,143, filed on Nov. 18, 2010.

(51) Int. Cl.
*H05B 37/02* (2006.01)

(52) U.S. Cl.
USPC .............................................. 315/76; 315/86

(58) Field of Classification Search
USPC ............... 315/76, 86, 130, 307, 312
See application file for complete search history.

(56) References Cited

U.S. PATENT DOCUMENTS

| | | | |
|---|---|---|---|
| 3,078,389 A | 2/1963 | Corry | |
| 3,344,269 A | 9/1967 | Brown | |
| 4,105,927 A | 8/1978 | Wilje | |
| 4,531,114 A | 7/1985 | Topol et al. | |
| 4,763,115 A | 8/1988 | Cota | |
| 4,796,018 A | 1/1989 | Nakanishi et al. | |
| 4,816,809 A | 3/1989 | Kim | |
| D352,564 S | 11/1994 | Marischen | |
| 5,493,272 A | 2/1996 | Beghelli | |
| 5,572,183 A | 11/1996 | Sweeney | |
| 5,662,408 A | 9/1997 | Marischen | |
| 5,816,682 A | 10/1998 | Marischen | |
| D404,508 S | 1/1999 | Marischen | |
| 5,886,620 A | 3/1999 | Stewart et al. | |
| 5,897,194 A | 4/1999 | Ham | |
| 6,246,221 B1 | 6/2001 | Reed | |
| 6,304,039 B1 | 10/2001 | Appelberg et al. | |
| 6,384,724 B1 | 5/2002 | Landais | |
| 6,518,878 B1 | 2/2003 | Skoff | |
| 6,606,808 B2 | 8/2003 | Katz | |

(Continued)

OTHER PUBLICATIONS

International Search Report received in corresponding PCT application No. PCT/US2012/039454, dated Oct. 1, 2012.

(Continued)

*Primary Examiner* — Don Le
(74) *Attorney, Agent, or Firm* — Wong, Cabello, Lutsch, Rutherford & Brucculeri, LLP.

(57) ABSTRACT

A monitoring system has integrated exit signs, which preferably have electroluminescent elements. The signs connect to internal wiring of a building, but local power sources can provide emergency power if building power is lost. Controllers on the signs communicate with a central workstation using building wiring and/or wireless communication. The controllers have one or more automated features for monitoring operation of the exit signs and the surrounding environment. These automated components, including an intensity sensor, an ambient light sensor, a temperature sensor, a smoke detector, a camera, a speaker, a microphone, a motion detector, an RFID detector, and the like. Because the signs are widely distributed throughout the building, operators can get detailed information of the building environment, security, fire, smoke, temperature, etc. The exit signs can store this information locally and can communicate useful information using a communication link to the central workstation.

24 Claims, 13 Drawing Sheets

(56) References Cited

U.S. PATENT DOCUMENTS

| | | | |
|---|---|---|---|
| 6,778,071 B2 | 8/2004 | Megerle | |
| 6,841,947 B2* | 1/2005 | Berg-johansen | 315/169.3 |
| 6,859,145 B2 | 2/2005 | Wilker et al. | |
| 6,873,256 B2 | 3/2005 | Lemelson et al. | |
| 7,026,768 B1 | 4/2006 | Ruiz | |
| 7,154,379 B2 | 12/2006 | Reed | |
| 7,158,040 B2 | 1/2007 | Morris | |
| 7,182,174 B2 | 2/2007 | Parrini et al. | |
| 7,191,510 B1 | 3/2007 | Sanderson et al. | |
| 7,259,670 B2 | 8/2007 | Cunningham et al. | |
| 7,385,517 B2 | 6/2008 | Andres et al. | |
| 7,528,700 B2 | 5/2009 | Picard et al. | |
| 8,033,686 B2* | 10/2011 | Recker et al. | 362/249.02 |
| 8,083,367 B2* | 12/2011 | Anderson et al. | 362/147 |
| 8,093,828 B2* | 1/2012 | Nagumo | 315/291 |
| 2001/0013185 A1 | 8/2001 | Chien | |
| 2001/0040798 A1 | 11/2001 | Appelberg et al. | |
| 2002/0040798 A1 | 4/2002 | Intonen et al. | |
| 2003/0179577 A1 | 9/2003 | Marsh | |
| 2003/0189823 A1 | 10/2003 | George et al. | |
| 2005/0052339 A1 | 3/2005 | Sprague | |
| 2006/0103638 A1 | 5/2006 | Podd | |
| 2007/0096663 A1 | 5/2007 | Wong et al. | |
| 2007/0262731 A1* | 11/2007 | Jaffar et al. | 315/291 |
| 2008/0016366 A1* | 1/2008 | Monroe | 713/182 |
| 2008/0266076 A1* | 10/2008 | Barrieau et al. | 340/506 |
| 2009/0128353 A1* | 5/2009 | Gonzales | 340/691.5 |
| 2010/0045155 A1 | 2/2010 | Padilla | |
| 2010/0117545 A1* | 5/2010 | Kelly et al. | 315/152 |
| 2010/0188023 A1* | 7/2010 | Anderson et al. | 315/312 |
| 2010/0263184 A1 | 10/2010 | Ray et al. | |
| 2010/0301755 A1* | 12/2010 | Pance et al. | 315/149 |
| 2011/0187543 A1* | 8/2011 | Russo et al. | 340/628 |
| 2012/0206050 A1* | 8/2012 | Spero | 315/152 |

OTHER PUBLICATIONS

"LTC3535 Dual Channel 550mA 1MHz Synchronous Step-Up DC/DC Converter," (c) Linear Technology Corporation 2009, www.linear.com, LT 0910 REV A, 16 pages.

"LT3580 Boost/Inverting DC/DC Converter with 2A Switch, Soft-Start, and Synchronization," (c) Linear Technology Corporation 2007, www.linear.com, LT0809 REV E, 28 pages.

Microchip, PIC16F684 Data Sheet, "14-Pin, Flash-Based 8-Bit CMOS Microcontrollers with nano Watt Technology," (C) 2007 Microchip Technology, Inc., DS41202F, 192 pages.

"Dual In-Series Small-Signal High Voltage Switching Diode," Vishay Semiconductors, GSD2004S-V, Document No. 85728, www.vishay..com, Rev. 1.4, Jan. 3, 2006, 5 pages.

Omron, "PCB Relay G5V-2: Miniature Relay for Signal Circuits," Cat. No. K046-E1-03, 4 pages.

* cited by examiner

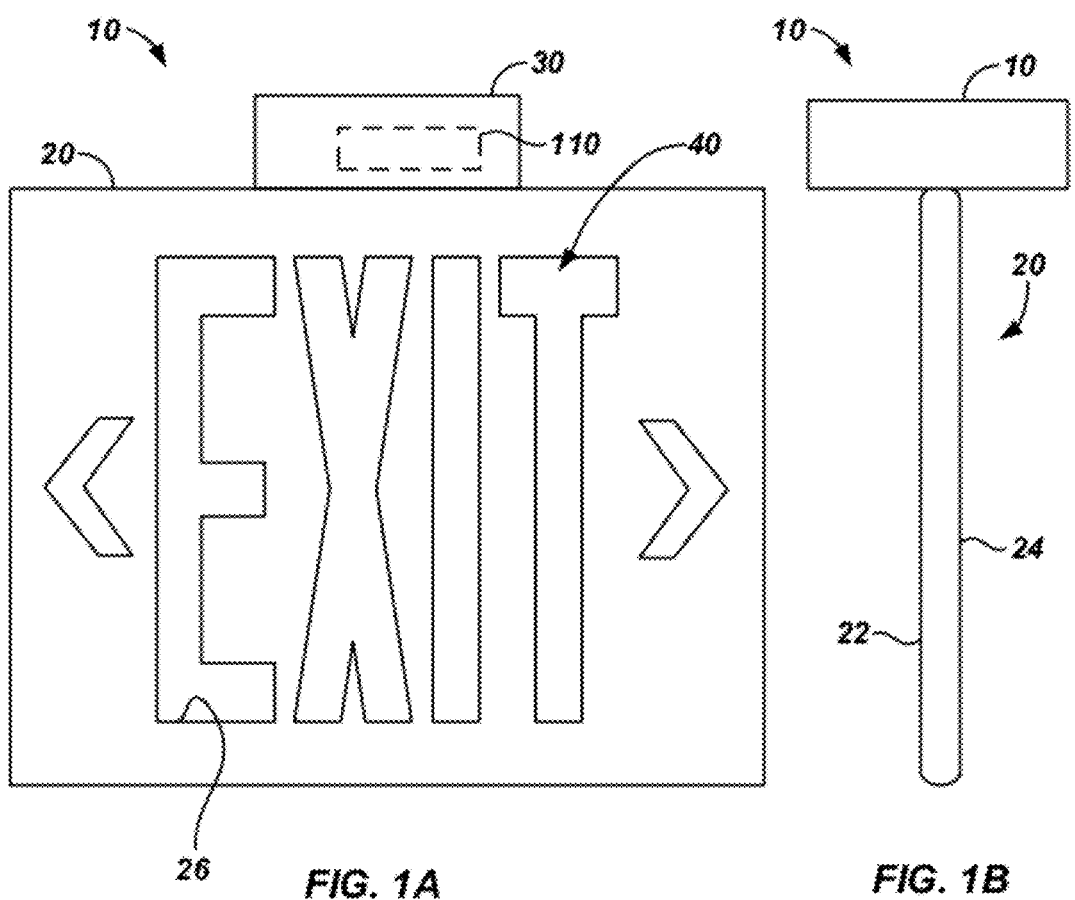

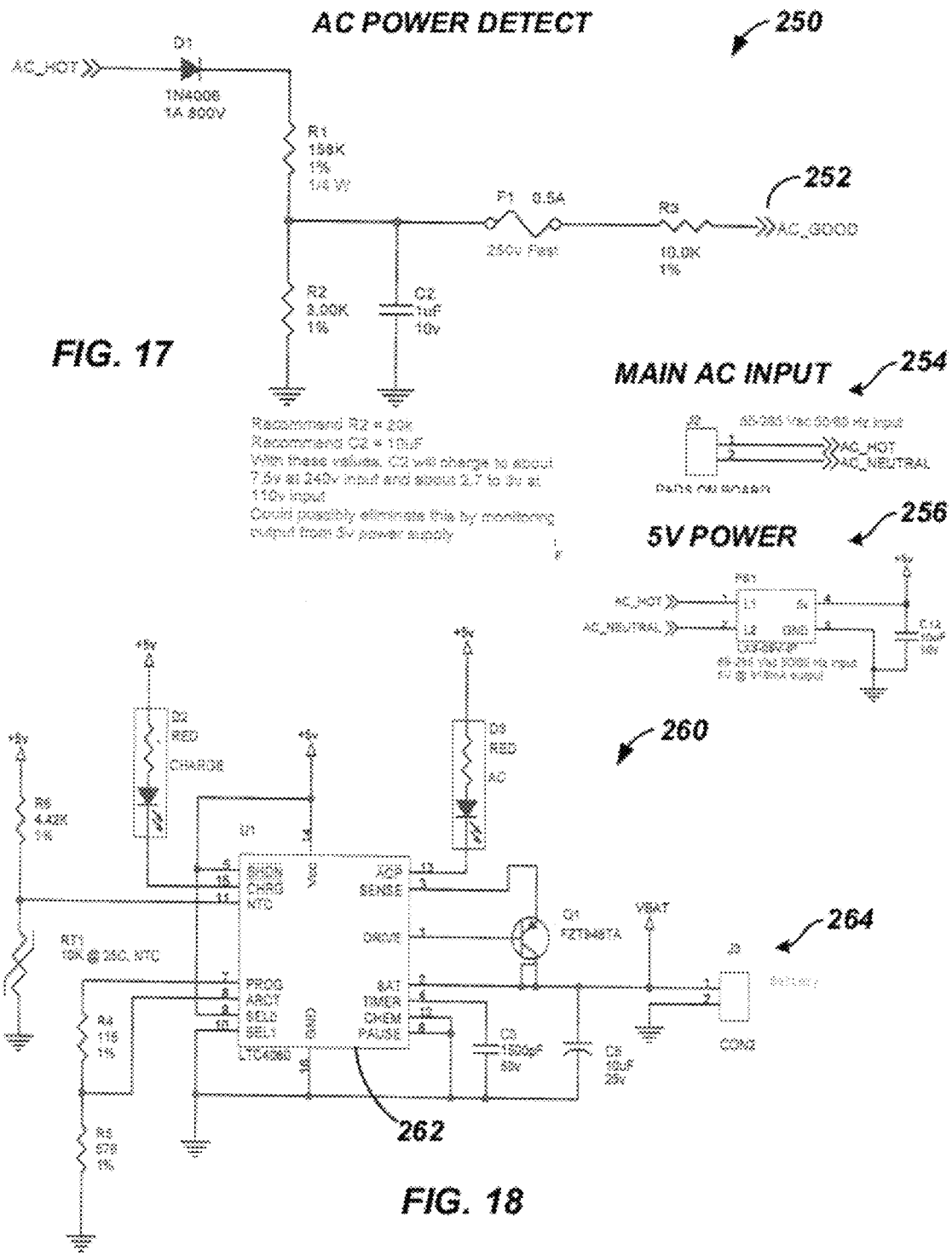

INTEGRATED EXIT SIGNS AND MONITORING SYSTEM

CROSS-REFERENCE TO RELATED APPLICATIONS

This is a non-provisional of U.S. Provisional Appl. No. 61/415,143, filed 18 Nov. 2010, which is incorporated herein by reference and to which priority is claimed.

BACKGROUND OF THE DISCLOSURE

Buildings require exit signs throughout hallways, corridors, and other areas of the building to indicate the locations of emergency exits. To be effective, exit signs must remain continually illuminated and are designed to maintain a specific minimum luminance over a defined lifespan. Yet, the light source's intensity degrades over time. To overcome this, the light source for the exit sign usually start illuminating at a higher level at the start of its life so that a longer amount of time can pass before the light source needs replacement.

Exit signs can use a variety of light sources, including incandescent lamps, light emitting diodes (LED), or electroluminescent (EL) style elements, such as an EL panel or light emitting capacitor (LEO). An EL-style element essentially operates as a capacitor having a dielectric layer and a phosphor layer disposed between two conductive electrodes. The front electrode is typically transparent. When an alternating electric current is applied to the two electrodes, an electromagnetic field is developed, and the phosphor layer emits light.

Details related to electroluminescent elements are provided in U.S. Pat. Nos. 5,662,408; 5,816,682; and 7,191,510, which are incorporated herein by reference in their entireties. For example, the transparent front electrode can be made out of indium tin oxide. The phosphor layer has encapsulated phosphor screen-printed over the front electrode. The dielectric layer can contain a solvent, a binder, and barium titanate particles that are screen-printed over the phosphor layer. The rear electrode typically has a solvent, a binder, and conductive particles such as silver or carbon that are screen-printed over the dielectric layer.

The EL-style elements operate with relatively little current, which makes them well suited for light sources that operate continuously. Therefore, exit signs used in buildings and the like have been developed that use electroluminescent elements. Because exit signs form such an important part of a building's emergency system, enhanced capabilities of an exit sign can be a great advantage to maintenance, security, and emergency personnel.

SUMMARY OF THE DISCLOSURE

A monitoring system has integrated exit signs. In preferred implementations, the exit signs have electroluminescent elements, such as electroluminescent panels or light emitting capacitors. The exit signs connect to the internal wiring of a building, but local power sources for the each of the exit signs can provide emergency power if the building power is lost. Controllers on the exit signs communicate with a central monitoring workstation using the existing wiring and/or wireless communication.

The controllers have one or more automated features for monitoring operation of the exit signs and the surrounding environment. These automated components can include one or more of light intensity sensor, ambient light sensor, temperature sensor, memory unit, smoke detector, camera, speaker, microphone, motion detector, Radio-Frequency Identification (RFID) detector, and the like. Because the exit signs are widely distributed throughout the building, various personnel (e.g., operators, firefighters, and the like) can get detailed information of the building environment, security, fire, smoke, temperature, etc. from the monitoring by the exit signs. The exit signs can store this monitored information locally and can communicate useful information using WI-FI, WLAN, WWAN, LAN, or other form of communication to the central workstation.

The foregoing summary is not intended to summarize each potential embodiment or every aspect of the present disclosure.

BRIEF DESCRIPTION OF THE DRAWINGS

FIGS. 1A-1B illustrate front and side views of an illuminated safety sign, shown here as an exit sign, according to the present disclosure.

FIGS. 15-21 show control circuitry for the disclosed exit sign.

DETAILED DESCRIPTION OF THE DISCLOSURE

Figure 2A:
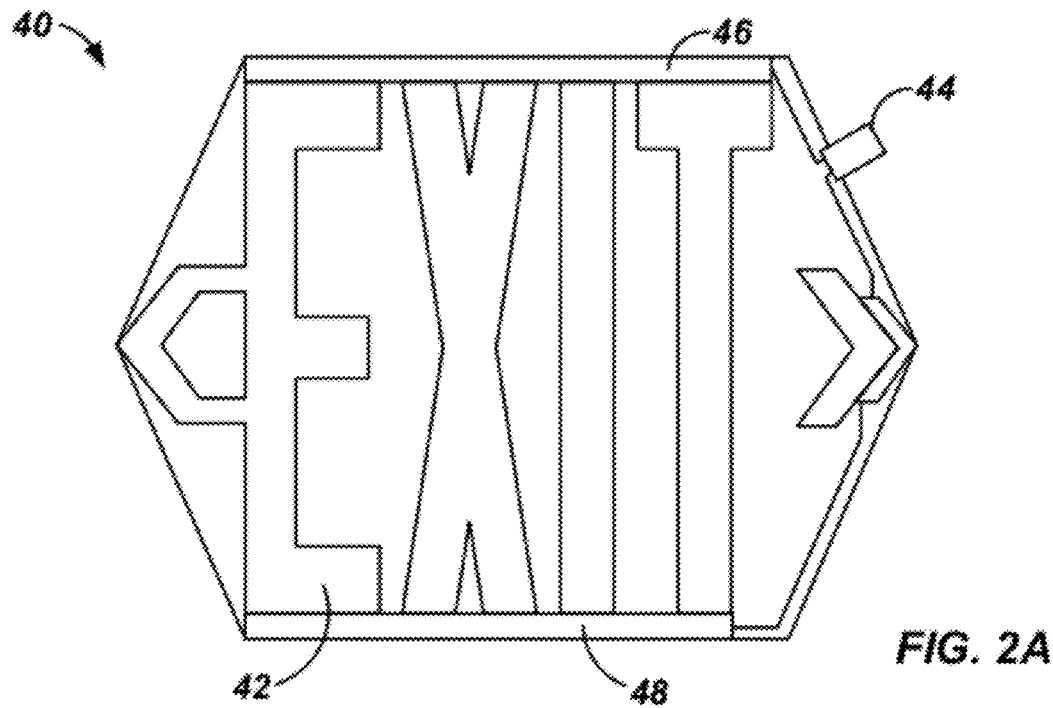
FIG. 2A shows an electroluminescent (EL) element for the disclosed exit sign.

FIGS. 1A-1B show an illuminated safety sign 10 according to the present disclosure having a housing 20 and a canopy 30, which can be constructed of thermoplastic or other suitable material. In the current depictions, the illuminated safety sign 10 is an exit sign used in a facility or building to indicate exits during emergencies, such as fires, power outages, and the like. Although the current description focuses on exit signs, other types of safety signs for a facility could benefit from the teachings of the present disclosure. Thus, the disclosed sign 10 can include illuminated signs indicating a fire extinguisher location, fire exit, danger, caution, notice, high voltage, restricted area, radiation area, electrical hazard, etc. for use in a facility or building. As such, the disclosed sign 10 can have any suitable insignia, symbols, pictures, lettering, and the like, which is illuminated for visibility in the facility or building.

For the exit sign 10 as shown in FIGS. 1A-1B, the sign's housing 20 affixes to the canopy 30, and the canopy 30 attaches to a surface structure or subsurface structure of the building, such as a ceiling, wall, or floor joists, using known fastening techniques. For example, the sign 10 can be top mounted from a ceiling, back mounted on a wall, side mounted on a wall, or hung between floor joists.

The housing 20 houses a light emitting element or light source 40 described in more detail below. The housing 20 can have front and back faces 22 and 24 with the insignia 26 of the signage defined therein. The canopy 30 houses control circuitry or a controller 110 for the sign 10.

In general, the light source 40 uses the phenomenon of electroluminescence, photoluminescence, chemiluminescence, bioluminescence, radioluminescence, thermoluminescence, etc. to emit electromagnetic radiation. In one preferred implementation, the light source 40 is an electroluminescent (EL) style element, such as a light emitting capacitors (LECs), although other light sources can be used, including, but not limited to, incandescent lights, fluorescents and compact fluorescents (CFL), light emitting diodes (LED), organic light emitting diodes (OLEDs), and polymer light emitting diodes (PLEDs).

Figure 2B:
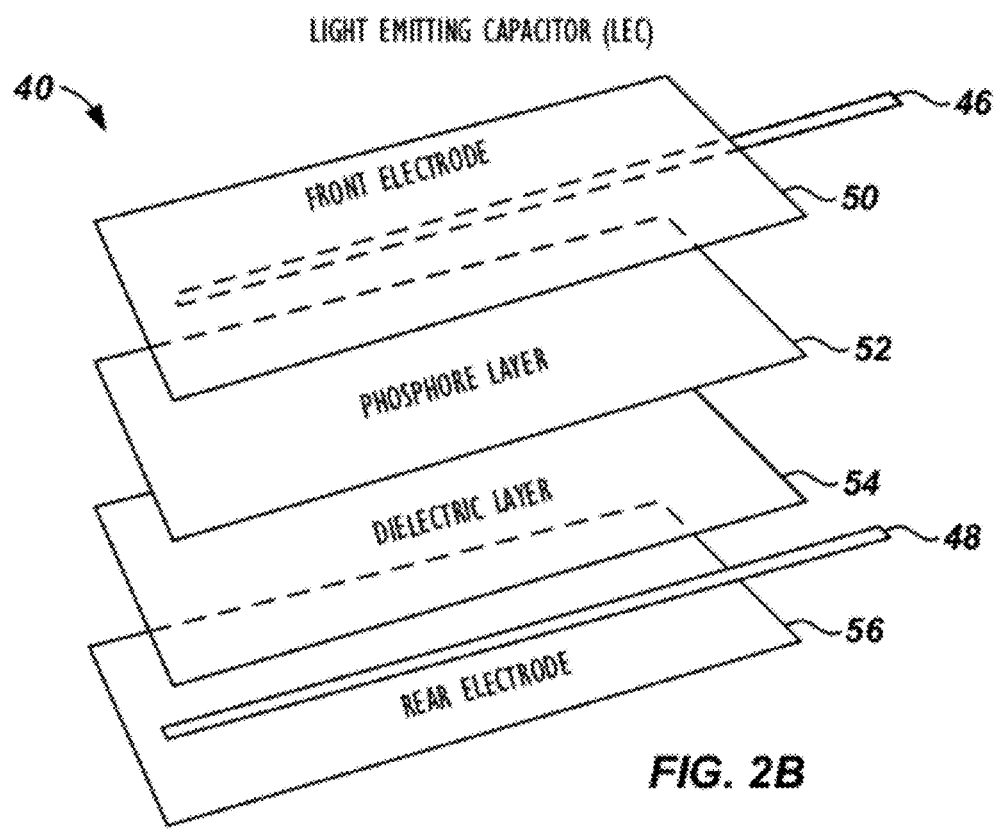
FIG. 2B shows layers of an EL element for the disclosed exit sign.

In FIGS. 2A-2B, an EL-style element for the light source 40 is shown for the disclosed exit sign 10. The EL-style element 40 has the form of an electroluminescent panel (also referred to as a light emitting capacitor (LEO)). As is known, electroluminescence directly converts electric energy to light using a solid phosphor subjected to an alternating electric field. The EL-style element 40 functions when phosphor particles are excited by an electrical field generated by applying an alternating current to front and back electrodes that sandwich a phosphor layer. The front and rear electrodes simply pass the electrical current and do not convert this into any other form of energy, such as heat or ultraviolet radiation.

The EL-style element 40 illuminates when the microencapsulated solid phosphors 42 are excited by an alternating electrical current (AC). The EL-style element 40 has a front electrode layer 50, a rear electrode layer 56, a dielectric insulating layer 54, and a microencapsulated solid phosphor layer 52. When an alternating current is applied to the front and rear electrode layers 50/56 by leads 46/48, an electromagnetic (EM) field is created that excites the phosphor layer 52 to produce luminous energy.

As shown in FIG. 2A, the leads 46/48 connect to a connector 44 of the EL-style element 40. The connector 44 connects to the controller (110) and power source for the disclosed exit sign 10. A test switch and LED indicator can be provided to allow users to test the sign's operation.

Figure 3:
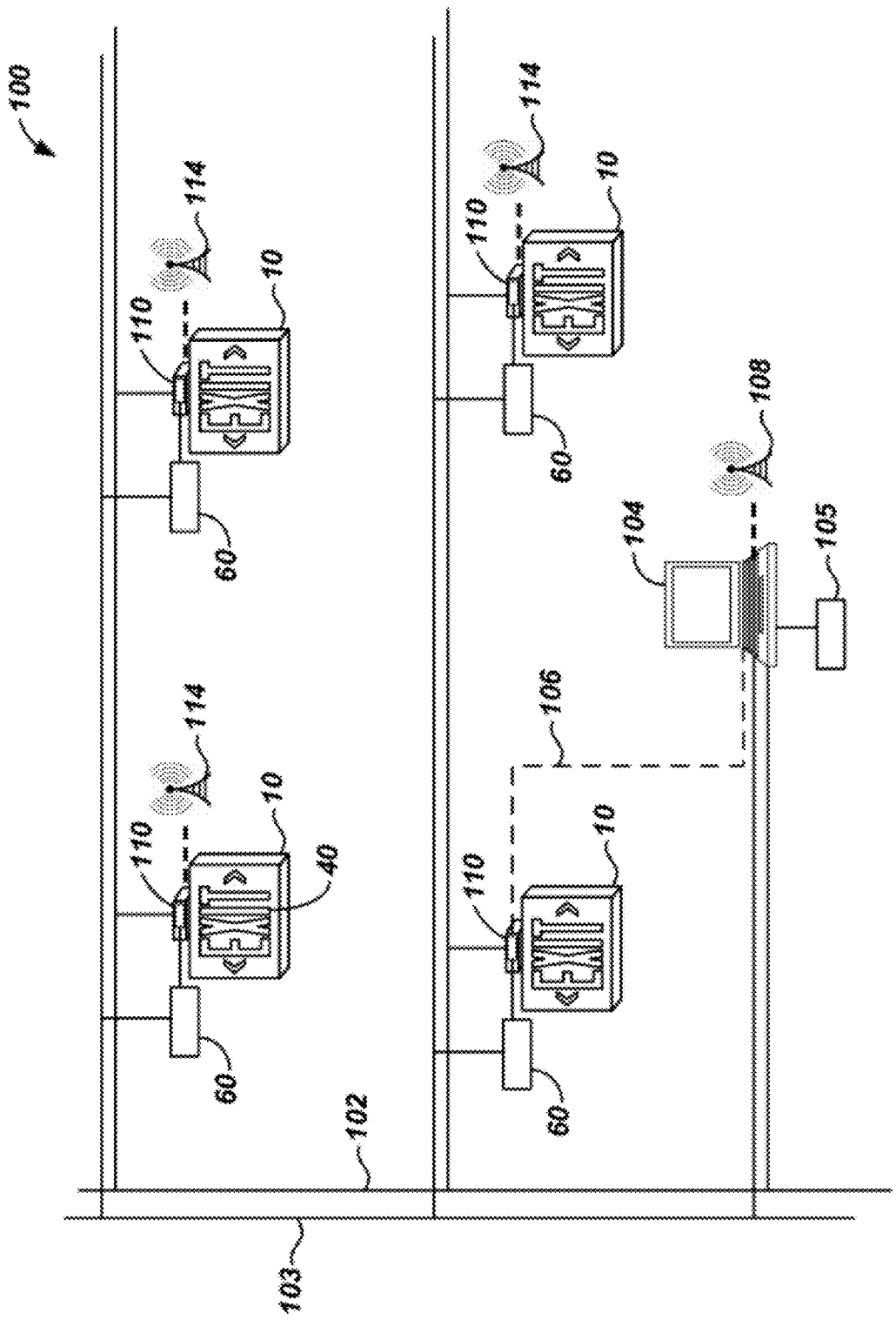
FIG. 3 schematically illustrates an exit sign monitoring system according to the present disclosure.

As shown in FIG. 3, the exit sign 10 can be used with other signs 10 in a facility or building. To monitor various parameters, an exit sign monitoring system 100 as shown in FIG. 3 has a central workstation 104 that communicates with the exits signs 10. For example, a sign's controller 110 in the housing 30 connects to internal wiring 102/103 of the building. In this way, the controller 110 can connect to the power lines 103 of the building, which provides power to the sign 10 during normal operation. Moreover, the controller 110 can connect to the fire alarm and building monitoring wiring 102 of the building.

Should the building's power fail, each of the exit signs 10 has an emergency power source 60, such as a battery-backup system, although multiple exit signs 10 can share such a battery-backup and/or can connect to an emergency generator backup system (not shown) of the building. Either way, the controller 110 couples to the emergency power source 60 when the building power is lost. In one embodiment, the emergency power source 60 is a battery source, such as a NiCd battery pack capable of operating for 2 hours. Other battery packs can be used, such as a Nickel Metal-Hydride (NiMH) battery pack.

The system's central monitoring workstation 104 couples to the building's existing wiring 102 and power lines 103. This central workstation 104 can include one or more computers and can have its own backup power supply 105. The workstation 104 can include conventional features for monitoring the security and safety of the building. For example, the workstation 104 can monitor fire alarms and security alarms of the building using the existing wiring 102.

To communicate with the various controllers 110 of the exit signs 10, the workstation 104 can couple to the controllers 110 via the existing building wiring 102, dedicated wiring 106, or wireless communication system 108. For wired communication, the system 108 and controllers 110 can use dedicated LAN lines 106 or the building's existing power line communication network 102. For wireless communication, the controllers 110 of the exit signs 10 have wireless communication devices 114, such as wireless transceivers known and used in the art. Any suitable form of communication protocol can be used for wireless communication. For example, the wireless devices 114 and system 108 can use, but are not limited to, WI-FI, WLAN, and WWAN.

As discussed in more detail later, components of the controller 110 extend the functionality of the exit sign 10 by incorporating other subsystems, including, but not limited to, cameras for surveillance; RFID scanners/readers; a climate control device (such as a thermostat); an entry/exit control device; wireless networking access points, switches, routers, and so on; fire/smoke detectors; and speakers and microphones for intercom systems. As such, a given one of the exit signs 10 in the system 100 can have one or more automated components, including intensity sensor, ambient light sensor, temperature sensor, memory unit, smoke detector, camera, speaker, microphone, motion detector, RFID detector, and the like. Because the exit signs 10 are widely distributed throughout the building, various operators (maintenance personnel, firefighters, or the like) can get detailed information of the building's environment, security, fire, smoke, temperature, etc. using the disclosed exit signs 10. In the end, the exit signs 10 can store and communicate useful information using WI-FI, WLAN, WWAN, LAN, or other form of communication.

When power goes out due to an emergency, for example, the exit sign 10 switches to emergency power from the battery supply 60 or other backup power source. The controller 110 also increases the brightness of the light source 40 when using backup power. For example, the regular power supply can be 120 Volts, 60 Hz. When the light source 40 is an EL-style element, the brightness of the EL-style source 40 during regular AC power operation can be from about 3.5 to 5 fL (foot lamberts). When switched to backup power, the brightness of the EL-style source 40 can be increased to 7 fL (foot lamberts) during emergency DC power operation. In general, the electroluminescent element's brightness can be increased by about 25% and can operate for up to 2 hours on the battery source 60.

As noted previously, the exit signs 10 for the monitoring system 100 can have one or more automated components, including light intensity sensor, ambient light sensor, temperature sensor, memory unit, smoke detector, camera, speaker, microphone, motion detector, Radio-Frequency Identification (RFID) detector, and the like. Various embodiments of exit signs 10 having one or more of these automated components are described below with reference to FIGS. 4-14. Each of these various components can be incorporated with one another in different combinations for an exit sign 10 to meet the needs of a particular application.

Figure 4:
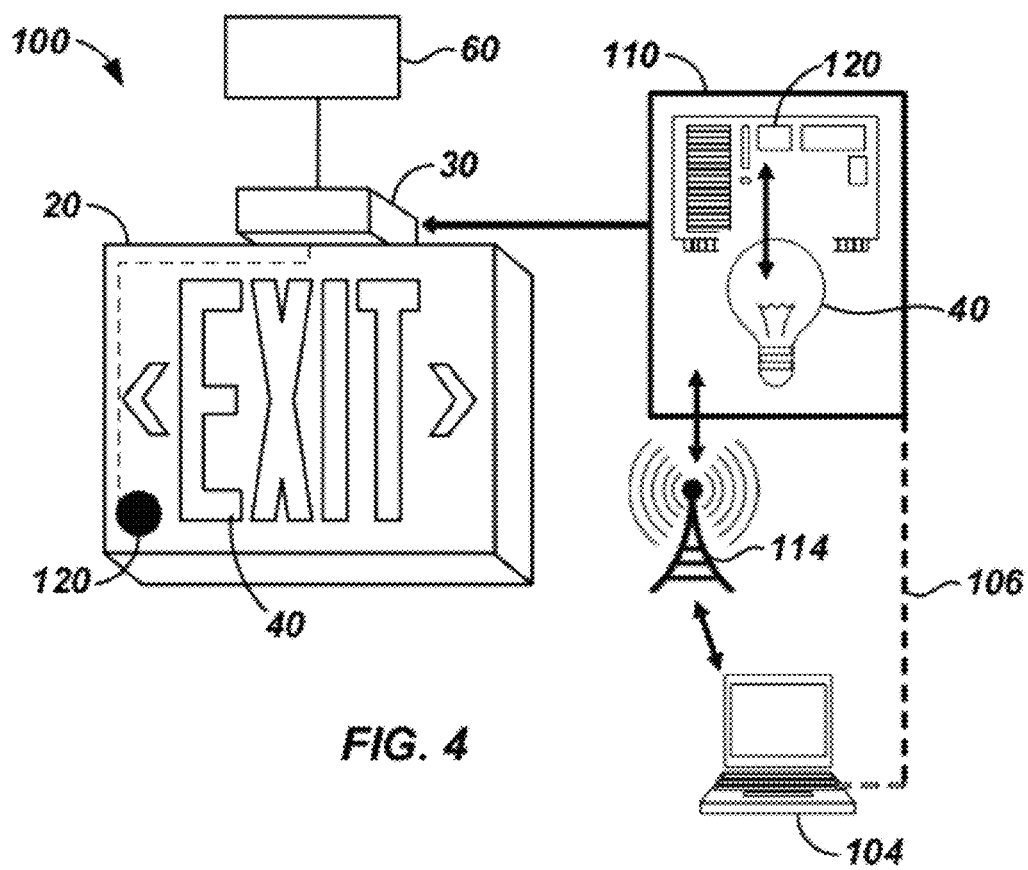
FIG. 4 shows an exit sign of the present disclosure having an integrated luminance sensor and communication device.

The exit sign 10 in FIG. 4 has an integrated sensor 120 and communication device 114. The controller 110 monitors the performance of the light source 40 with the integrated sensor 120. As disclosed herein, the light source 40 can be an EL style element, such as a light emitting capacitor or electroluminescent panel, but the source 40 can be any another other light element, such as LED, incandescent, CFL, etc. The integrated sensor 120 is disposed in the housing 20 and determines at least one property of the light source 40. For example, the integrated sensor 120 can measure a luminance and/or illumination level, an emission spectrum, an emission color, defect densities, power consumption, and a temperature of the light source 40. In one particular example, the integrated sensor 120 can be a light sensor, such as a photodiode or other element, that disposes adjacent the illuminating layer to measure the brightness of the light source 40 during operation.

A manual communication connector (not shown) can be connected with the integrated sensor 120 so maintenance personnel can manually determine the property (e.g., luminance, emission spectrum, etc.) of the source 40 for code compliance. Alternatively, the controller 110 can take measurements of the source's property with the integrated sensor 120 and can provide a local indication (e.g., LED indicator) of the need to change the light source 40. The controller 110 can have predetermined correlation information that correlates the measured property (e.g., luminous intensity per unit area, etc.) to compliance values.

Further, the controller 110 can communicate measurements of the source's property to the central workstation 104. Measurements can be manually instigated from the central workstation 104, or the controller 110 can have a timer to periodically make the measurements at any desirable interval, daily, weekly, monthly, etc. In turn, the controller 110 communicates the measurement to the central workstation 104 via the communication network, such as WI-FI, WLAN, and WWAN, so the workstation 104 can be used to log and assess the overall operation of the system 100.

With remote monitoring of the exit sign's property, maintenance personnel and electricians do not need to check each exit sign 10 manually for code compliance. In this way, the remote monitoring can offer considerable timesavings for larger office buildings. In addition to EL-style elements, compliance can be determined for LEDs or other elements used for the light source 40.

In addition to monitoring the light source 40 for compliance, the integrated sensor 120 can consistently determine the luminescence of the light source 40 so the controller 110 can control (reduce) power and prolong the life of the light source 40. Power control can be determined for EL, LED, or other elements used for the light source 40, and the controller 110 can have predetermined correlation information that correlates measured luminance to power supplied. In this way, the controller 110 can monitor the luminance of the light source 40 to reduce the power needed to keep the source 40 illuminated with a required brightness.

Figure 5:
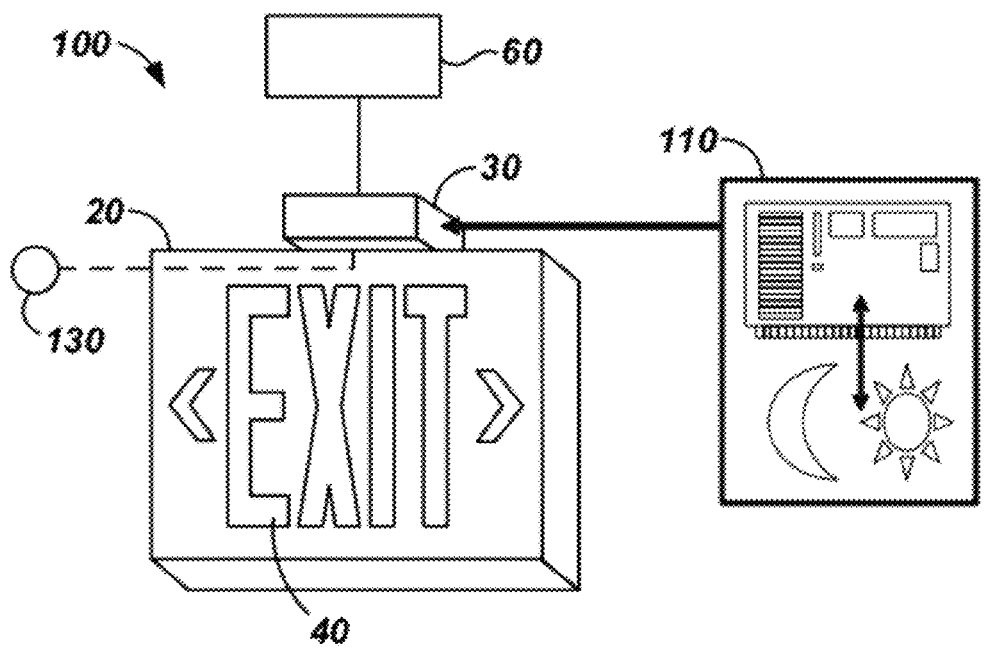
FIG. 5 shows an exit sign of the present disclosure having an integrated ambient light sensor.

As shown in FIG. 5, the exit sign 10 has an ambient sensor 130 disposed on the sign 10. The ambient sensor 130 can measure at least one property of ambient conditions, including, but not limited to, a presence of smoke, an ambient light level, a motion threshold, a vibration level, and an ambient temperature. In one particular example, the ambient sensor 130 can be an ambient light sensor, such as a photodiode or the like, that measures the luminance of the ambient light in the sign's surrounding environment. The controller 110 monitors the measurements of this ambient light sensor 130 and adjusts the brilliance of the exit sign 10 based on the amount of ambient light detected. By adjusting the brilliance of the exit sign 10, the controller 110 can thereby provide an appropriate amount of luminance for various ambient light conditions in the environment.

By using one or both of the sensors 120 and 130 in FIGS. 4-5, the sign's controller 110 can help the light source 40 to function within certain standards, such as National Fire Protection Association (NFPA), Underwriters Laboratories (UL), Canadian Standards Association (CSA), International Organization for Standards (ISO), and others. Likewise, the sign's controller 110 can help the light source 40 to function within desired parameters, such as: (i) maintaining the light source 40 more or less bright based on the amount of ambient light present; (ii) maintaining the light source 40) more or less bright depending on emergency situation based on sensor feedback (e.g., smoke or temperature for fires, vibration for earthquakes, power outages, and so on); and (iii) maintaining the light source 40 at a minimum level of luminance or brightness required to extend or maximize the lifespan of the source 40) as well as minimizing energy consumption.

Figure 6:
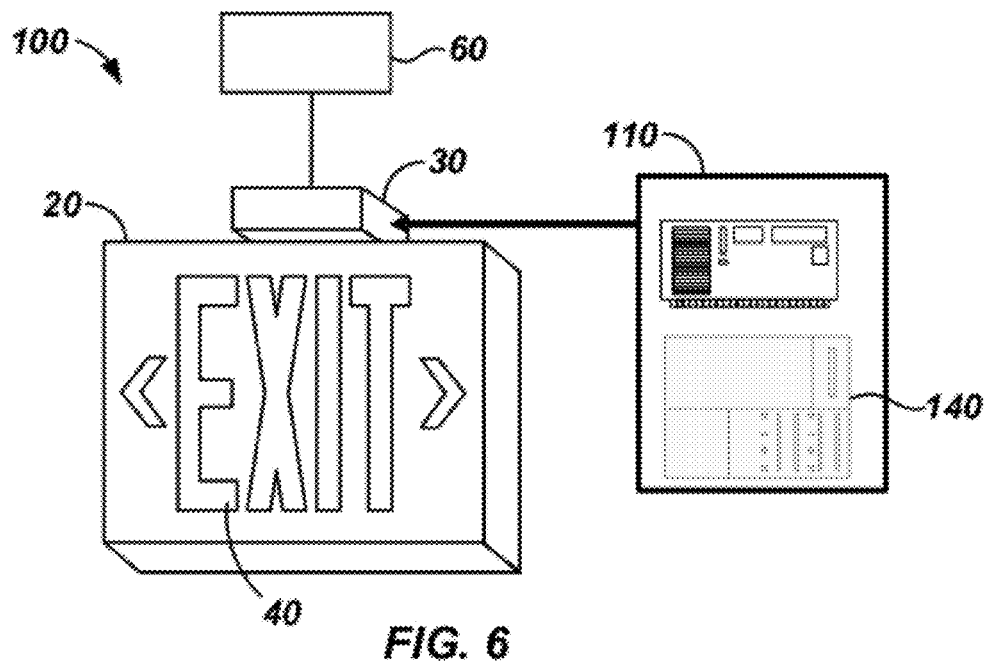
FIG. 6 shows an exit sign of the present disclosure having an integrated memory unit.

As shown in FIG. 6, the exit sign 10 has an integrated memory unit 140. The controller 110 uses the memory unit 140 to store periodic data collected by the controller 110. The memory unit 140 can be any suitable memory that can operate using the battery source 60 under harsh conditions. For example, the memory unit 140 can include a protected flash drive. During operation, the controller 110 stores data collected by integrated sensors and incorporated components (e.g., light sensor, ambient light sensor, smoke detector, heat sensor, accelerometer, etc. as disclosed herein). When a fire occurs in the building, this stored data can be retrieved from the protected memory unit 140 and can give fire investigators information to help determine the source, spread, and possible cause of the fire.

Figure 7:
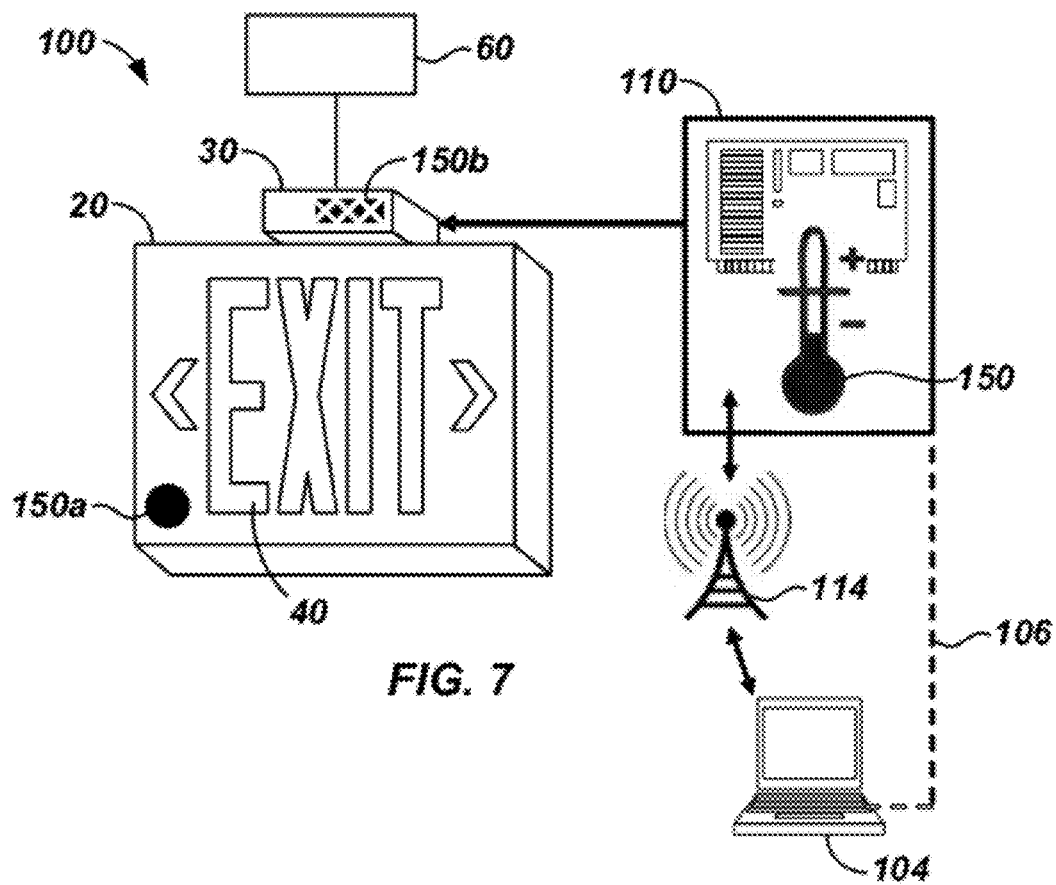
FIG. 7 shows an exit sign of the present disclosure having an integrated (vibration or temperature) sensor and communication device.

As shown in FIG. 7, the exit sign 10 has another integrated sensor 150 coupled to the controller 110 to monitor an ambient condition in the environment around the exit sign 10. In one example, the sensor 150 includes an accelerometer or other type of vibration sensor to monitor vibration in the vicinity of the exit sign 10. The detected vibration can be indicative of seismic disturbance (i.e., when an earthquake is occurring) or indicative of damage to the exit sign 10. As the controller 110 monitors the detected vibrations, the controller 110 can activate an alarm condition when the vibrations reach a threshold level. In response to the alarm condition, the controller 110 can increase the intensity of the light source 40, activate a local audible alarm, communicate the alarm condition or detected vibration to the central workstation 104, and/or perform some other proactive action.

In another example, the sensor 150 is a local ambient temperature sensor used to monitor the ambient temperature in the environment around the exit sign 10. The temperature sensor 150 can be any appropriate type of sensor for detecting temperature. As with the vibration sensor noted previously, the temperature sensor 150 can be mounted with the housing 20 as with sensor 150a, mounted with the canopy 30 as with sensor 150b, or mounted remotely from the sign 10.

During operation, the sensor 150 determines the ambient temperature surrounding the sign 10. Then, the controller 110 stores this data and/or communicates this temperature information on a periodic basis. For example, the controller 110 can communicate the temperature readings to the central workstation 104. In turn, the temperature readings can be used in conjunction with the building's HVAC system to control the temperature of the building.

Additionally, the temperature information can be used to initiate a fire alarm or to conduct a fire investigation or the like. When a fire occurs, for example, the monitored temperature information can describe the ambient temperatures at individual signs 10 throughout the building. This information can be used to set of fire alarms and can be used later to determine the spread of fire and hot gasses.

Figure 8:
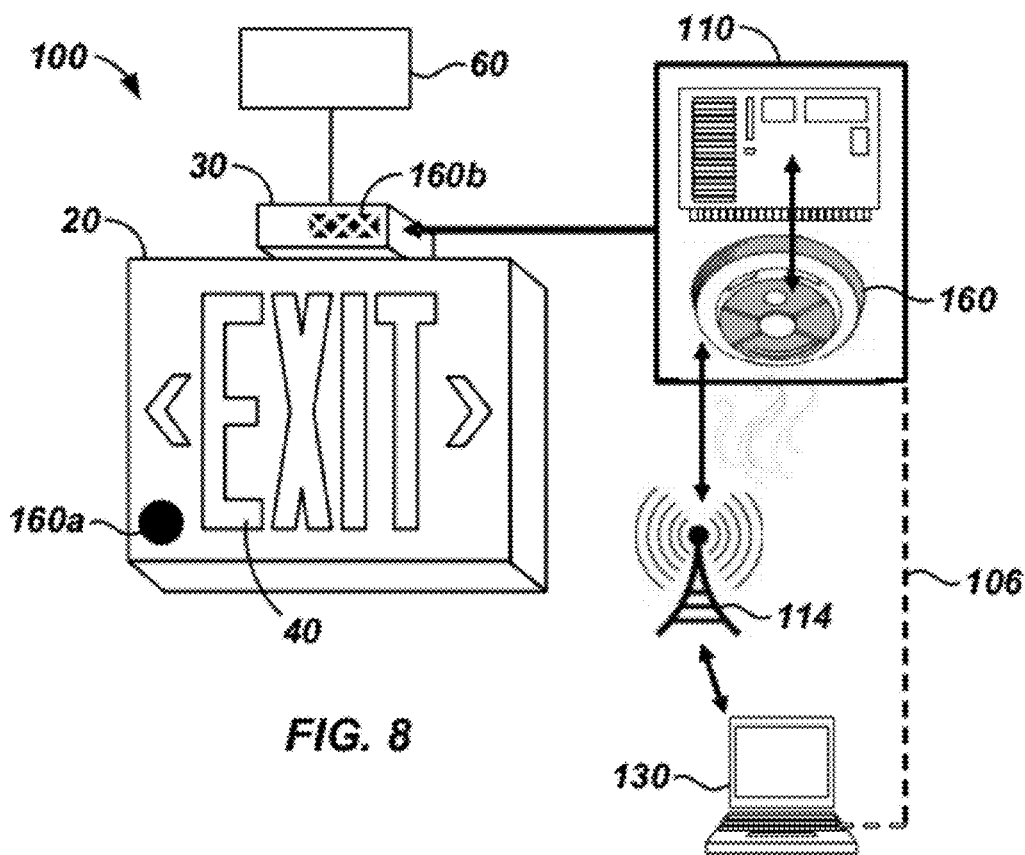
FIG. 8 shows an exit sign of the present disclosure having an integrated smoke detector and communication device.

As shown in FIG. 8, the exit sign 10 has a smoke detector or alarm 160. In one implementation, the smoke detector 160 can be incorporated into the exit sign 10. For example, the detector 160 can be mounted with the housing 20 as with detector 160a or mounted with the canopy 30 as with detector 160b. Alternatively, the detector 160 can be a freestanding detector mounted near the sign 10 and communicatively coupled to the controller 110.

Either way, the controller 110 monitors the smoke detector 160. In this way, the sign 10 can test the air for the presence of smoke and other gasses or airborne chemicals that can be detected. This information can be stored locally and/or remotely communicated. The information can give an accurate description of the ambient conditions at individual signs throughout the building and can be used to monitor the spread of fire, hot gasses, and smoke. When smoke is detected, the controller 110 can activate an alarm to be communicated to the central workstation 104 and can also increase the brightness of the sign in the smoked filled environment to make the sign 10 more visible.

Figure 9:
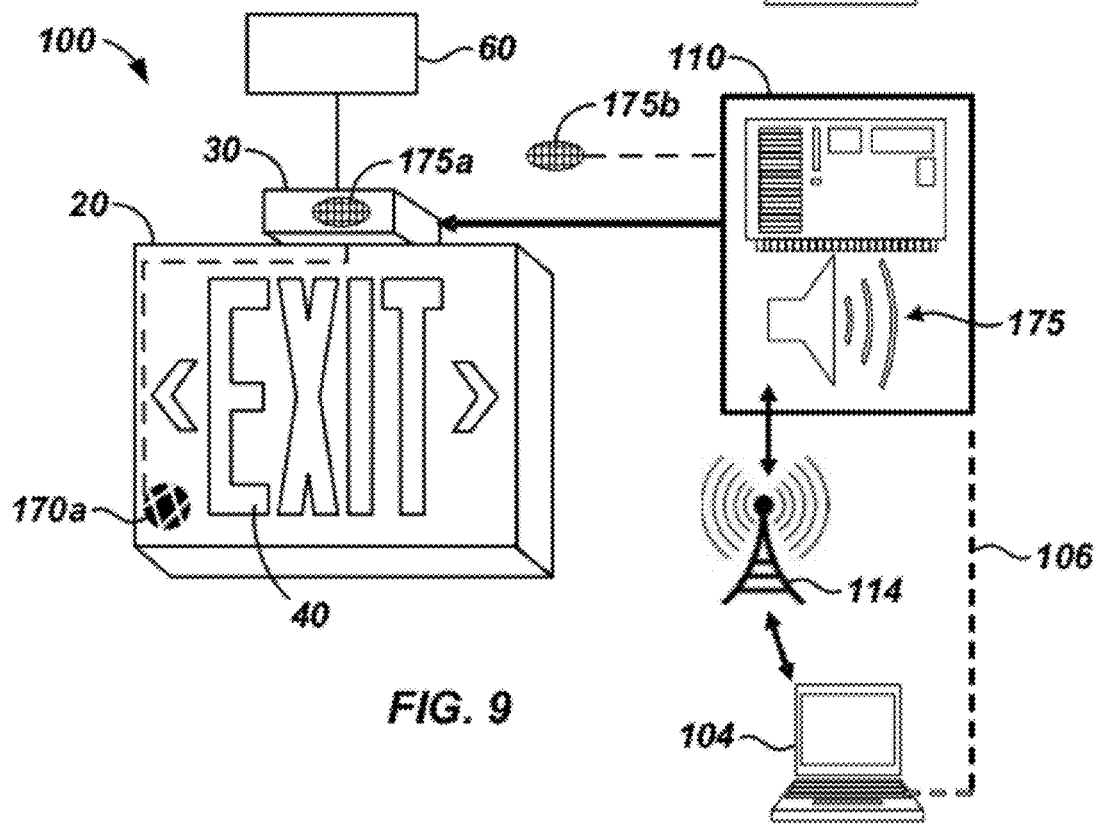
FIG. 9 shows an exit sign of the present disclosure having an integrated speaker, microphone, and communication device.
Figure 11:
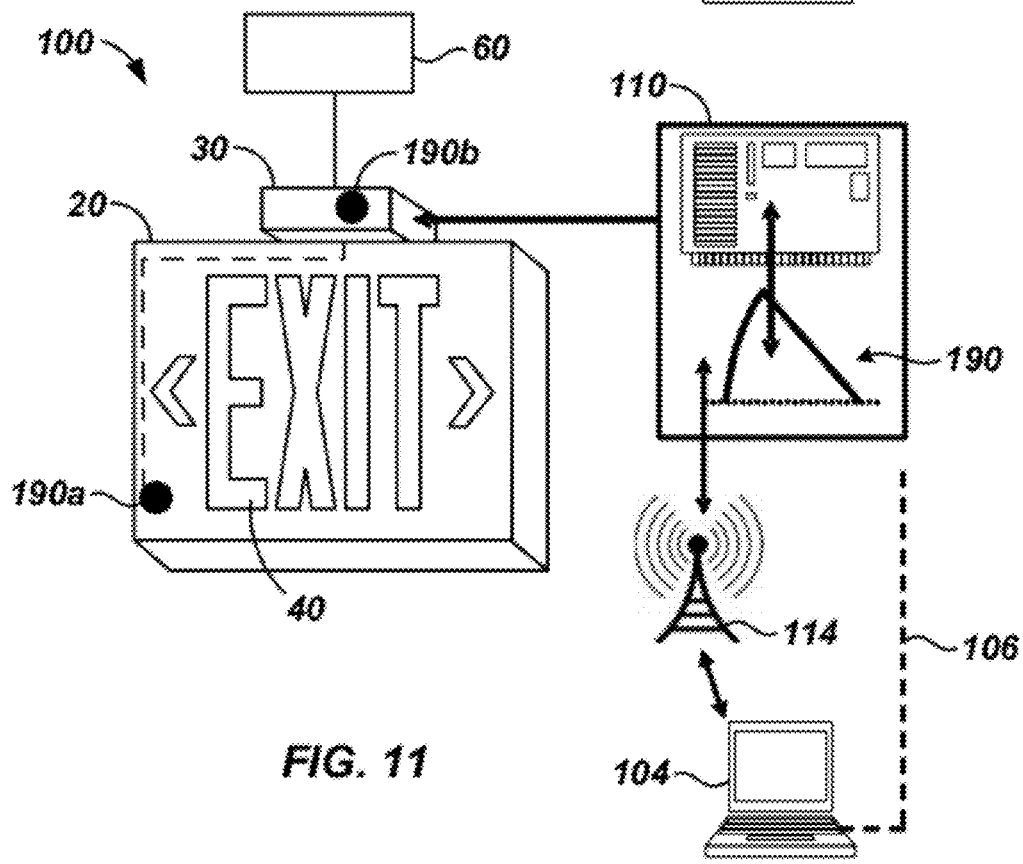
FIG. 11 shows an exit sign of the present disclosure having an integrated motion detector and communication device.

As shown in FIG. 9, the exit sign 10 has an integrated microphone 170 and speaker 175. The microphone 170 can remotely monitor the audible sounds around the exit sign 10. The speaker 175 can communicate a message from a remote position such as from the workstation 104 using one of the communication channels (e.g., 106 or 114). Alternatively, the speaker 175 can play a preprogrammed message stored locally at the controller 110. The speaker 175 can work in conjunction with a motion detector (190; FIG. 11) discussed below to guide an individual through a predetermined egress path or through an egress path determined by working in conjunction with the other sensors to choose the safest path of egress. The microphone 170 and speaker 175 also allow for two-way communication by security personnel of the building at a central location. To that end, the controller 110 can use the communication device 114 to communicate with the central workstation 104 or can use building wiring 106 or the like.

The microphone 170 can be mounted with the housing 20 as shown, although the microphone 170 could be mounted elsewhere on the sign 10 or remote from the sign 10. Likewise, the speaker 175 can be mounted with the sign 10 as with speaker 175a or mounted remotely as with speaker 175b.

Figure 10:
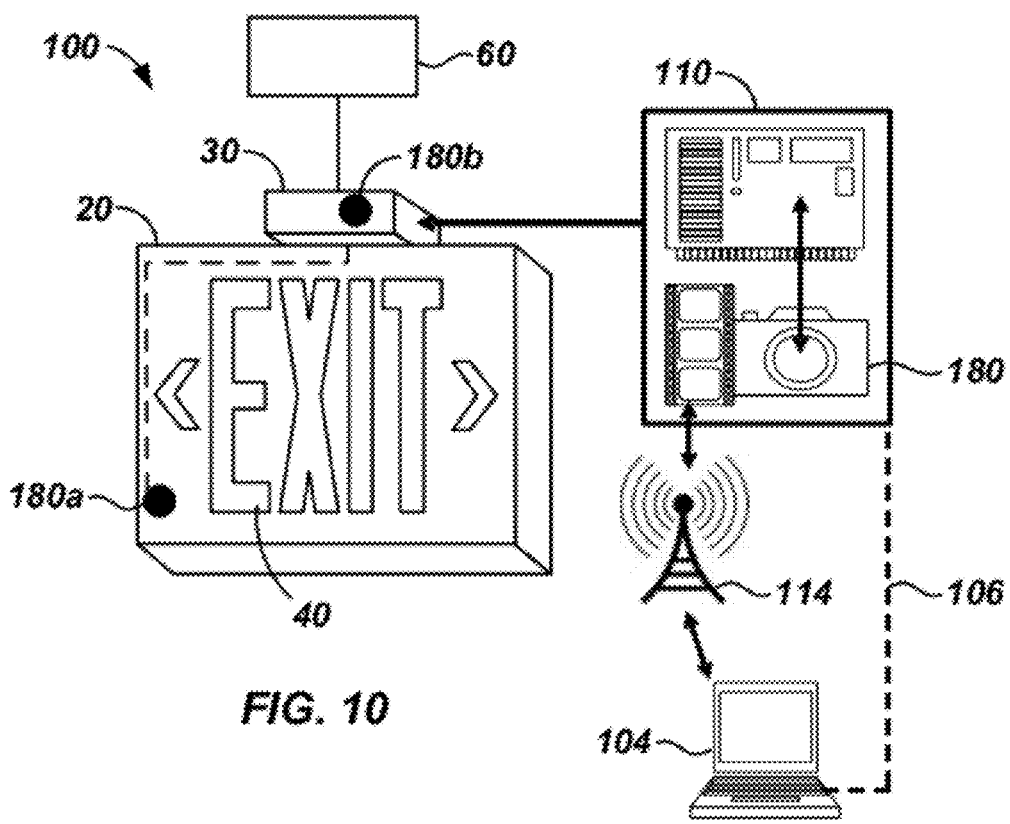
FIG. 10 shows an exit sign of the present disclosure having an integrated camera and communication device.

As shown in FIG. 10, the exit sign 10 has an integrated camera 180, which can be a still camera, a video camera, infrared camera, or the like. The camera 180 can be mounted with the housing 20 as with 180a or the canopy as with 180b, although the camera 180 could be mounted remote from the sign 10.

The integrated camera 180 can be used to view the current conditions around the exit sign 10 and to view people near the exit sign 10 or the occupancy of a room, such as an Americans with Disability Act (ADA) style safe-room. If infrared, the camera 180 can be configured to view through smoke when there are adverse conditions. When used for assessing egress or building security, the camera 180 integrated in the exit sign 10 can store this information and can communicate the photos, videos, or live feed to the central workstation 104 via one of the communication channels (e.g., 106 or 114).

As shown in FIG. 11, the exit sign 10 has an integrated motion detector 190 that detects motion near the exit sign 10. The motion information can be used for security and energy efficiency. For example, the motion detector 190 can detect movement near the exit sign 10, and the controller 110 can increase brightness of the light source 40 if movement is detected. If no motion is detected, the controller 110 can keep the light source 40 at minimum brightness. As with other detectors, the motion detector 190 can be mounted with the housing 20, the canopy 30, or remote from the sign 10.

As noted previously, the motion detector 190 can work in conjunction with the speaker (175; FIG. 9) and other disclosed sensors on the exit sign 10. During an emergency, these components can be operated together to guide an individual through a predetermined egress path in a building. Alternatively, the components can guide an individual through an egress path determined by working in conjunction with the other sensors and exit signs 10 to choose the safest path of egress. For example, information from other temperature sensors, motion detectors, smoke detectors, and the like as disclosed herein on various exit signs 10 in the building can indicate an egress path in the building that is safer. The speakers (175) and other components on the exit signs 10 can then be used guide the individual through the safer route.

Figure 12:
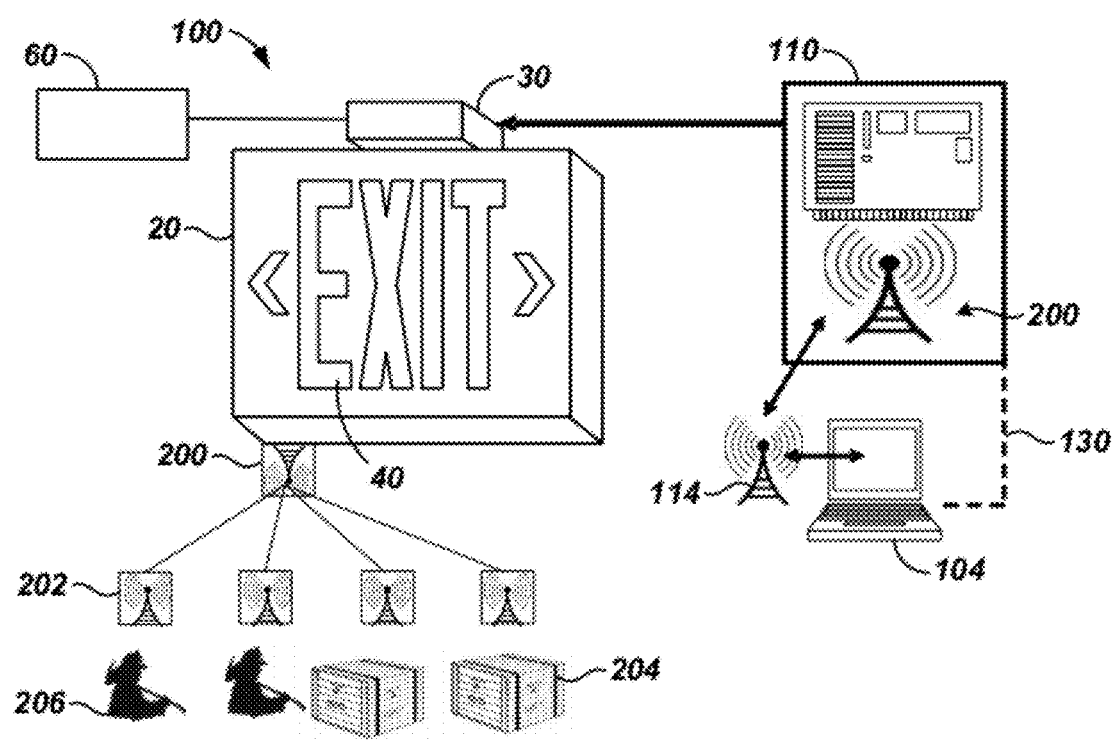
FIG. 12 shows an exit sign of the present disclosure having an integrated RFID detector and communication device.

As shown in FIG. 12, the exit sign 10 has an integrated Radio-Frequency Identification (RFID) detector or reader 200 for use with RFID tags 202. Using various types of RFID technologies, the network of detectors 200 incorporated with the exit signs 10 can pick up the unique signals transmitted by each tag 202. Evaluation of the detected tags 202 can then be used to determine locations of high-value property 204 or the like.

The detection can also be used to identify specific people 206 having tags 202. For example, disabled persons in the building may have tags 202 for monitoring purposes, and detection of the tags 202 can indicate the person's location or occupancy of an ADA safe-room during the emergency. The detection can also be used to indicate the location of firefighters 206 or other emergency personnel in the building.

The RFID reader 200 and tags 202 can be used for these and other useful purposes. Various forms of RFID detectors 200 and tags 202 can be used. For example, the RFID reader 200 can use passive or active RFID technology. The RFID reader 200 can also use condition-sensing tags 202 that include circuitry that reads and transmits diagnostics back to the reader 200. The tags 202 monitor the environmental conditions, communicate with other items, and collaborate to collect data. As before, any information obtained with the detectors 200 can be stored locally at the controller 110 or communicated to the central workstation 104 using the communication channels (e.g., 106 or 114).

Figure 13:
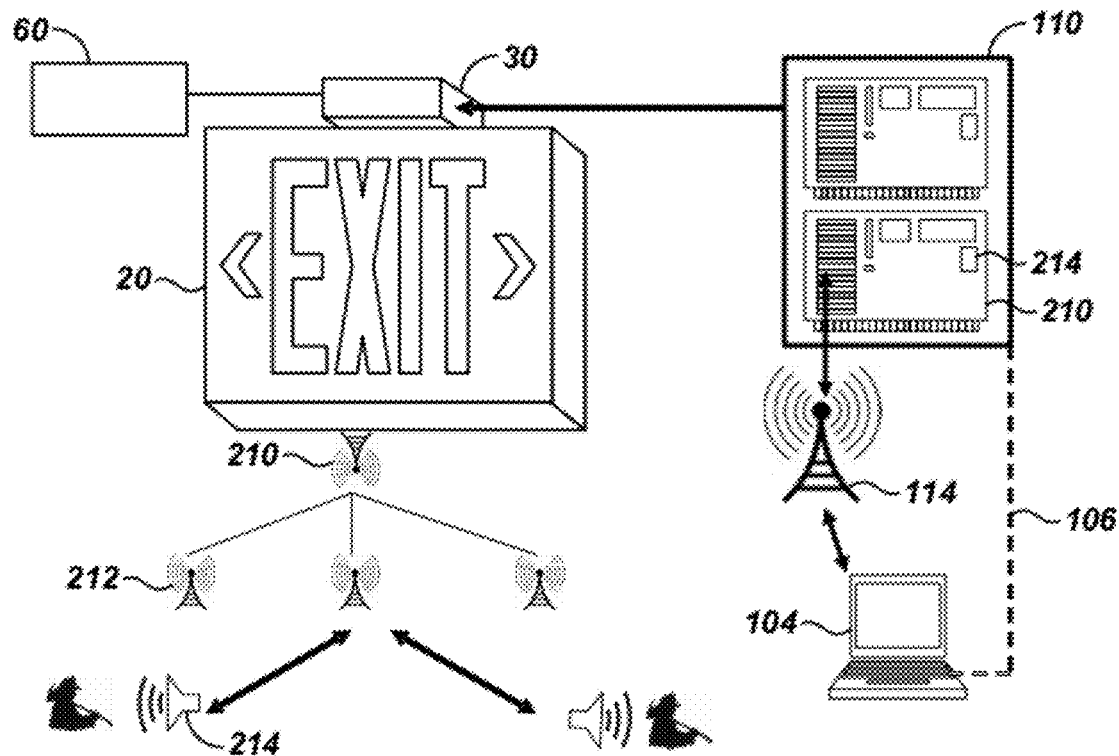
FIG. 13 shows an exit sign of the present disclosure having additional communication and signal enhancement or amplification capabilities.

As shown in FIG. 13, the controller 110 includes the communication device 114 for remote communication with the central workstation 104. In addition, the controller 110 can include a communication system 210 capable of communicating with other exit signs 10 or other devices having communication systems 212. The other devices can be two-way radios or other wireless communication devices used by security, firefighters, or other personnel.

As will be appreciated, communication signals may attenuate in a building due to distance, materials, design, and other forms of interference. Bi-directional amplifiers 214 can be used to boost the signal of the two-way communication devices 210/212 and wireless communication throughout the building or structure. Therefore, incorporating a bi-directional amplifier 214 in the controller 110 can enhance the wireless and radio communications capabilities of the exit sign 10.

Figure 14:
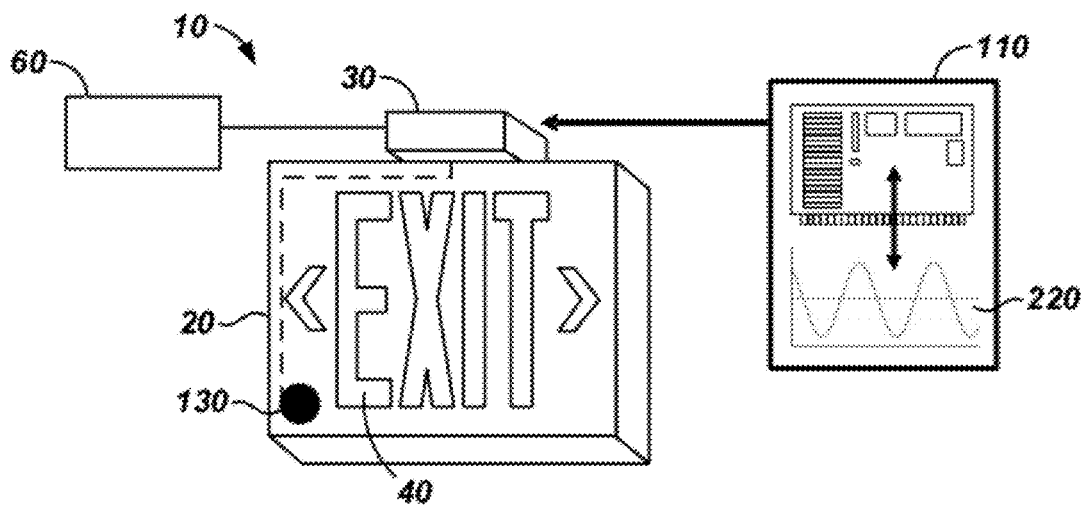
FIG. 14 shows an exit sign of the present disclosure having circuitry for controlling the brilliance/luminance of the element.

Referring to FIG. 14, the controller 110 controls the brilliance of the element 40 using power control circuitry 220. As discussed below, the power control circuitry 220 can be used with an EL-style light source 40, such as EL panel or LEO. In one technique, the power control circuitry 220 can control the voltage applied to the light source 40. By increasing the voltage, the power control circuitry 220 can increase the element's brilliance, although this may not be a preferred way to increase the brilliance. In another technique, the power control circuitry 220 modifies the waveform used to operate the EL-style light source 40. For example, the control circuitry 220 can control the emission of light from the light source 40 by adjusting a shape (e.g., rise time, sine wave, square wave, sawtooth wave, etc.) of a waveform used to power the light source.

For example, a sharper rise time of the waveform can generally increase the brightness of the EL-style light source 40. The power control circuitry 220 can modify the sine wave with faster rising edges to change the RMS voltage used for the EL-style light source 40. This increases the brilliance of the light source 40 with all other parameters held constant. Yet, this technique may shorten the life of the EL-style light source 40 so that it may no be preferred in some implementations.

In yet another technique, the power control circuitry 220 can control the brilliance of the EL-style light source 40 by increasing the frequency of the sine wave used to power it. To do this, the power control circuitry 220 is programmed with power control algorithms so the controller 110 can control the waveform and frequency of the sine wave used to operate the EL-style light source 40. Using PWM (pulse width modulation) signaling and a low pass filter, the controller 110 creates a waveform at a desired frequency. In general, the higher the frequency produced by the controller 110, the brighter the light source 40 will illuminate. Preferably, the desired frequency for operating the EL-style light source 40 is in the range of 50 to 80-Hz.

FIGS. 15-21 show some of the control circuitry for the controller 110 of the disclosed exit sign 10. Details of these portions of the control circuitry are discussed below. In general, however, the controller 110 can include a microprocessor, microcontroller, FPGA, or other programmable control device that has programmable data storage to store executable data, data from sensors, and other information. The controller 110 also has communication capabilities, whether wireless or wired, with other subsystems or modules within the exit sign (10) or with other components of the system (100). As needed, the controller 110 also has supporting electronic circuitry, such as transformers, power supplies, transistors, diodes, resistors, capacitors, and so on, which are not discussed in detail. Finally, the controller 110 can have any additional circuitry to handle the various features disclosed above.

Figure 15:
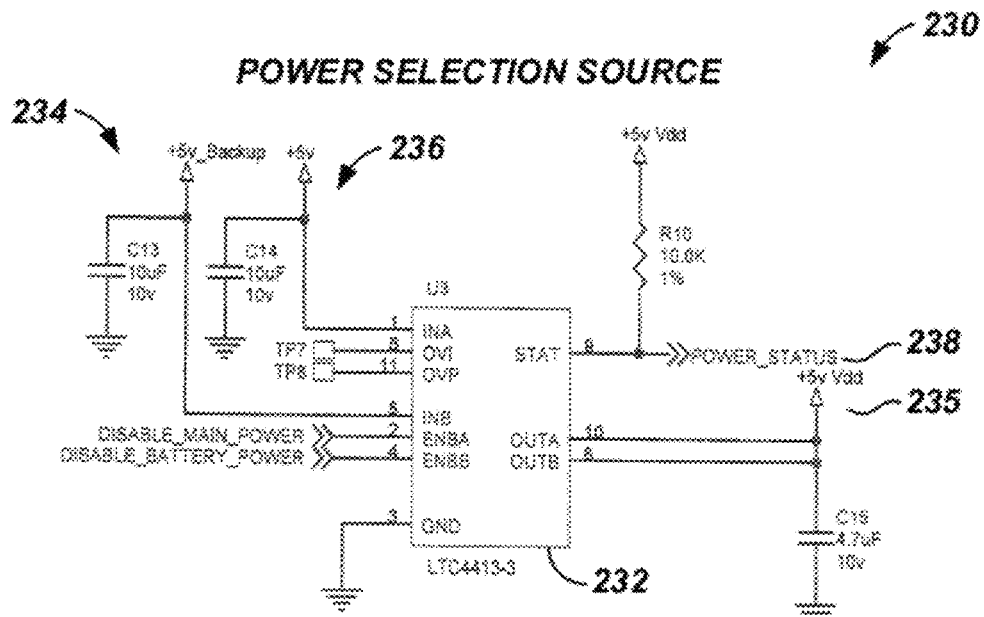

FIG. 15 shows a power selection circuit 230. The circuit 230 uses an Oring diode 232, such as the LTC4413-3 available from Linear Technology. This circuit 230 is used to select the backup power 234 from the battery or to select source power 236 from the main AC input (FIG. 17). Power status 238 is provided by the circuit 230 to a microcontroller discussed below in FIG. 19. Additionally, output power 235 is provided by the circuit 230 for the control circuitry.

Figure 16:
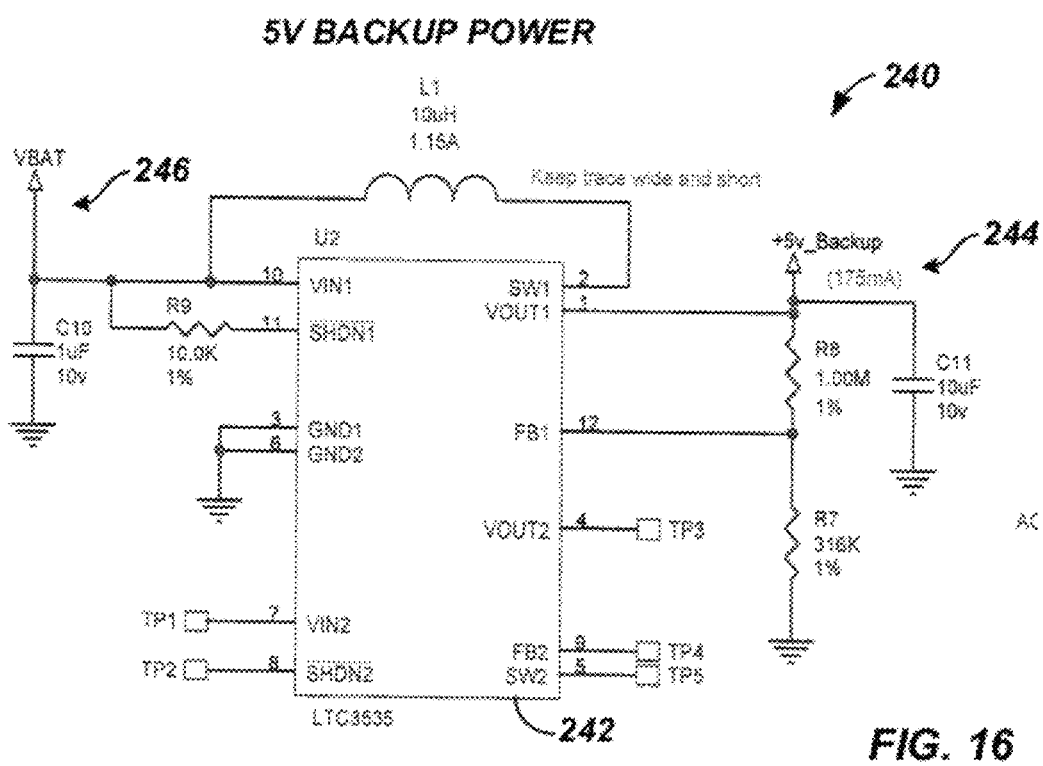

FIG. 16 shows a 5V backup power circuit 240 having a dual channel, synchronized, fixed frequency step-up DC/DC converter 242. The circuit 240 can use a step-up DC/DC converter 242, such as the LTC3535 available from Linear Technology. Battery power 246 is received and backup power 244 is provided for the power selection source circuit 230 of FIG. 15.

FIG. 17 shows an AC power detection circuit 250 coupling to an AC hot line as input. The circuit 250 provides an indication 252 that the AC power is "good" to the microcontroller discussed below in FIG. 19. FIG. 17 also shows the main AC input 254 and 5V power circuit 256 for the control circuitry.

FIG. 18 shows a battery charger circuit 260 having a battery charger 262 that couples by a connection to a backup battery 264. The battery charger circuit 260 can use a linear NiMH/NiCd fast battery charger 262, such as the LTC4060 available from Linear Technology.

Figure 19:
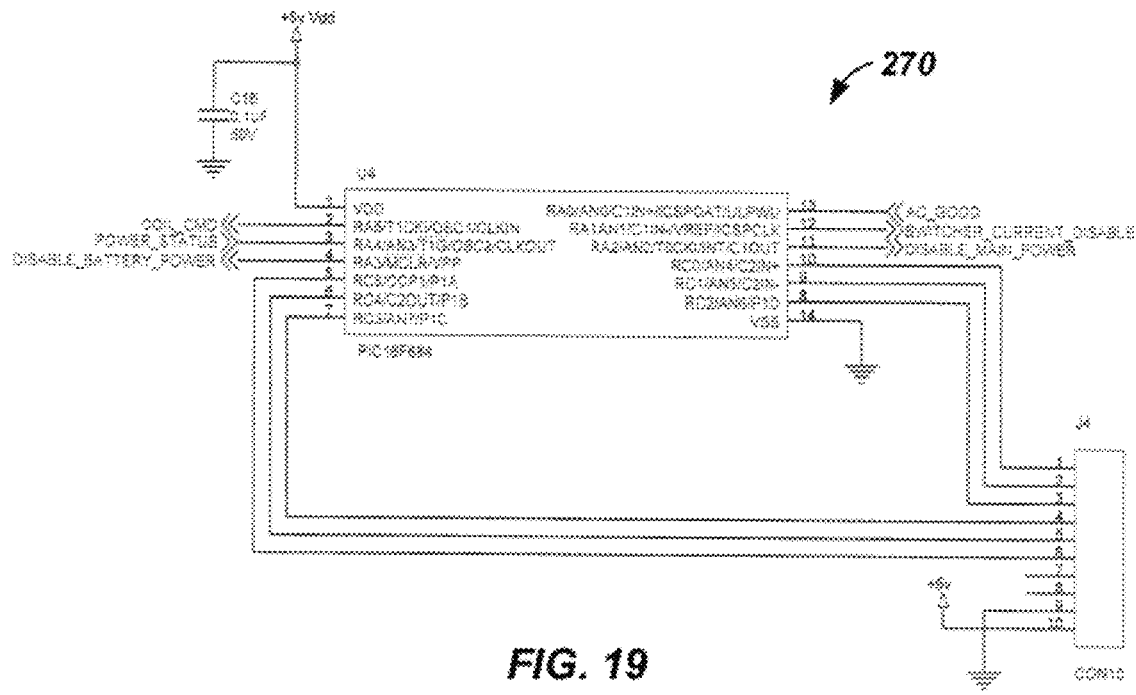

FIG. 19 shows a microcontroller 270 for the control circuitry. This microcontroller 270 can be a flash-based microcontroller with onboard EEPROM data memory. One suitable microcontroller 270 is the PIC16F684 available from Linear Technology. The microcontroller 270 couples to signal inputs and outputs for the control circuitry and is programmed in accordance with the functions described in the present disclosure.

As noted previously, the controller 110 can control the emission of light from the light source (40) by changing the input signal parameters (e.g., voltage and frequency) to the source (40) to adjust the properties of the emitted light to be within desired parameters. As also noted previously, the brightness of the light source (40) as an EL-style element can be increased when the frequency is increased. To that end, the microcontroller 270 can be programmed to create the waveform for operating the EL-style light source (40) using pulse width modulation (PWM) signals. The microcontroller 270 reduces the time interval between each pulse. For a sine wave, the time that the PWM pulse is "ON" is the sine of the position of the PWM pulse divided by the period of the waveform. The time it is "OFF" is the difference of the period of the PWM pulse less the time it is "ON." The microcontroller 270 modifies the intervals of the pulses to control the brightness of the EL-style light source (40) with a preferred waveform and frequency as discussed previously.

Figure 20:
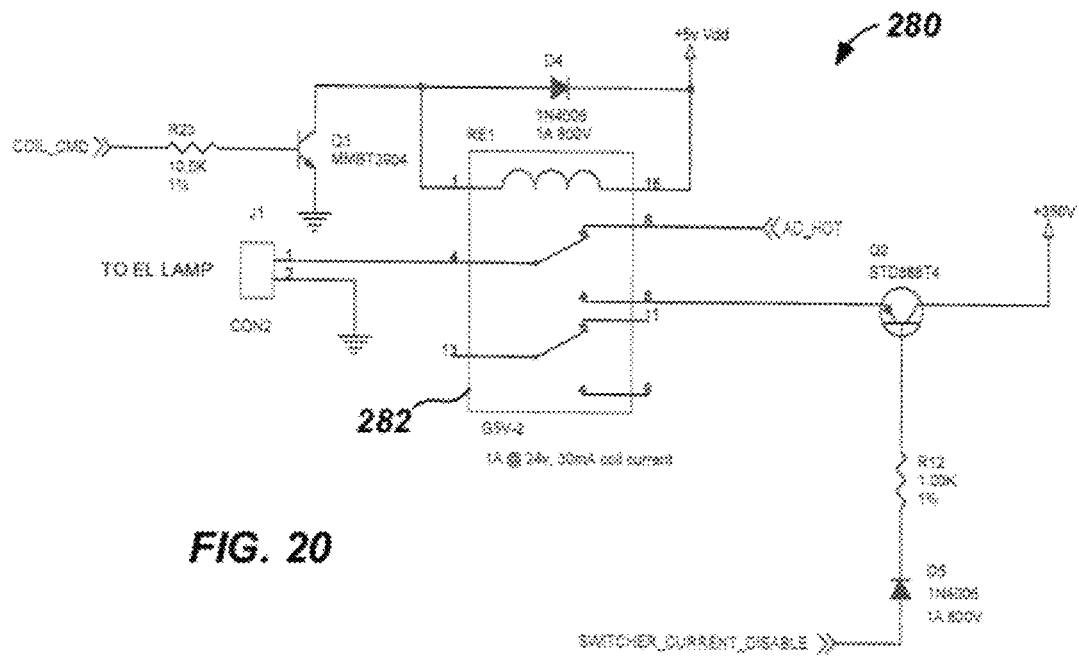

FIG. 20 shows a relay circuit 280 having a relay 282 for switching between AC power and switcher current. The relay 282 is controlled by a coil command from the microcontroller 270 of FIG. 19.

Figure 21:
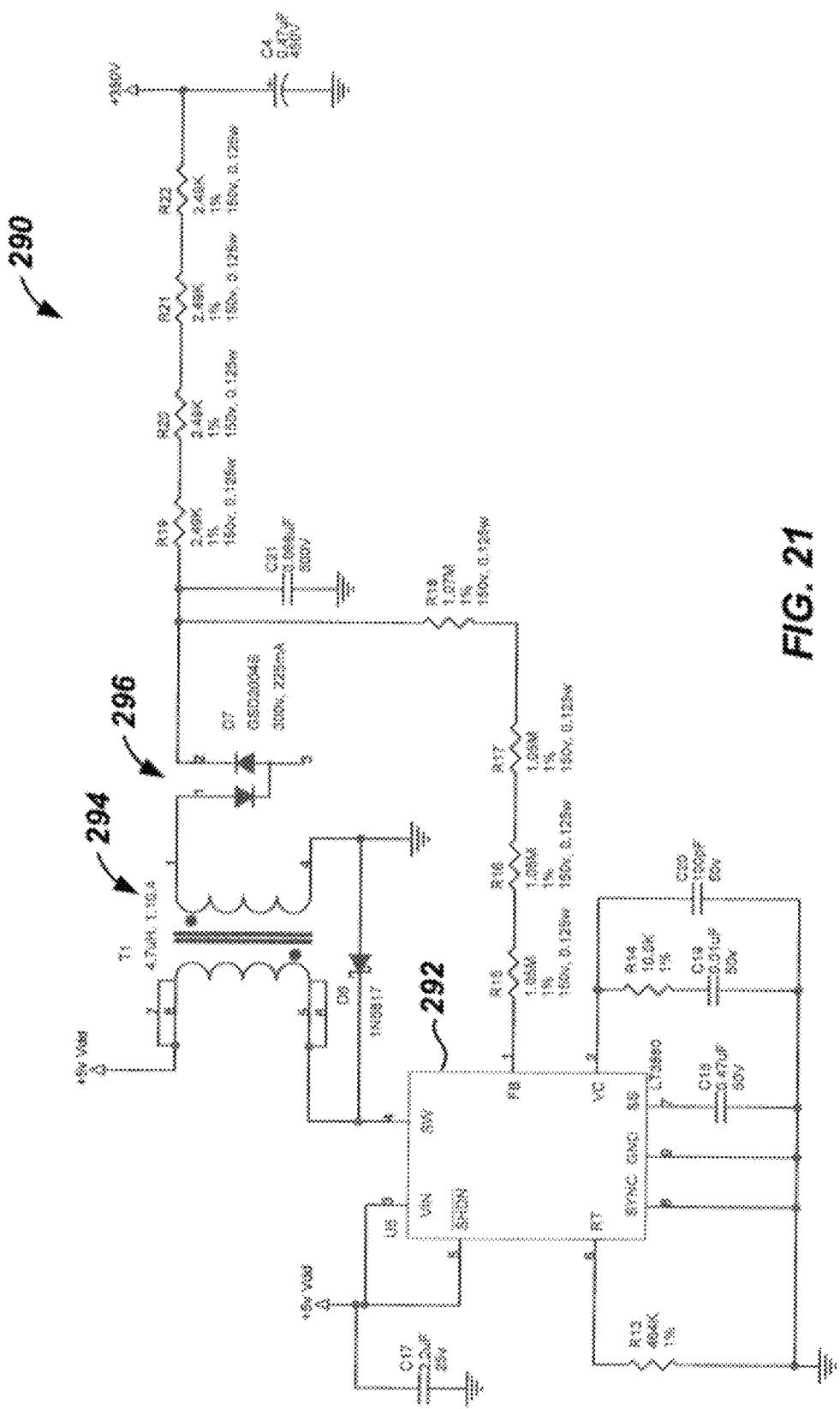

FIG. 21 shows power circuitry 290 having a PWM DC/DC converter 292, a transformer 294, and a switching diode 296 for the control circuitry. The PWM DC/DC converter 292 can use an LT3580 available from Linear Technology. The switching diode 296 can be a Dual In-Series Small-Signal High-Voltage Switching Diode series GSD2004S available from VISHAY Semiconductors.

Poles (7-8) of the transformer 294 connect to the Overvoltage Protection Sense Input (OVI) and Overvoltage Protection Output (OVP) pins on the Oring diode (232) of FIG. 15. Poles (1-5) of the transformer 294 and switching diode 296 connect to pins for the second channel on the step-up DC/DC converter (242) of the backup power circuit (240) of FIG. 16. The pins include the second channel's battery input voltage (VIN2), the logic controlled shutdown input (SHDN2), the output voltage sense and drain of the internal synchronous rectifier (VOUT2), the feedback input to the $g_m$ Error Amplifier (FB2), and the switch pin (SW2).

The foregoing description of preferred and other embodiments is not intended to limit or restrict the scope or applicability of the inventive concepts conceived of by the Applicants. Several separate embodiments of signs have been disclosed herein with each including one or more of the disclosed automated components. Each of the disclosed components can be combined or exchanged with one another in additional embodiments not explicitly shown in the present disclosure, but evident to one skilled in the art having the benefit of the present disclosure.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An illuminated safety device for a facility coupled to a power source, the device comprising:
   a light source powered by the power source and having a luminescent panel emitting light;
   at least one sensor disposed adjacent the luminescent panel and detecting emitted intensity thereof; and
   control circuitry operatively coupled to the light source, the at least one sensor, and the power source, the control circuitry monitoring the emitted intensity detected by the at least one sensor and adjusting the power to the luminescent panel to control the emitted intensity.

2. The device of claim 1, wherein to adjust the power to the luminescent panel to control the emitted intensity, the control circuitry comprises power circuitry adjusting a frequency of a waveform used to power the luminescent panel of the light source.

3. The device of claim 1, further comprising an ambient light sensor detecting an ambient intensity of ambient light, and wherein to control the emitted intensity, the control circuitry increases or decreases the emitted intensity of the light source relative to an increase or decrease in the ambient intensity.

4. The device of claim 1, wherein to adjust the power to the luminescent panel, the control circuitry maintains the emitted intensity at least at a threshold intensity.

5. The device of claim 1, further comprising a temperature sensor obtaining ambient temperature readings, and wherein the control circuitry increases or decreases the emitted intensity of the light source when the ambient temperature reading exceeds a threshold.

6. The device of claim 1, further comprising a motion sensor detecting motion in the vicinity of the device, and wherein the control circuitry increases or decreases the emitted intensity of the light source in response to the detected motion.

7. The device of claim 1, further comprising a smoke detector detecting a presence of smoke, and wherein the control circuitry increases or decreases the emitted intensity of the light source in response to the detected presence of smoke.

8. The device of claim 1, further comprising a radio frequency identification device detecting a presence of a radio frequency identification tag in the vicinity of the device, and wherein the control circuitry increases the emitted intensity of the light source in response to the detected presence of the tag.

9. The device of claim 1, wherein the light source is selected from the group consisting of an electroluminescent element, an electroluminescent panel, a light emitting capacitor (LEC), an organic light emitting diode (OLED), and a polymer light emitting diode (PLED).

10. The device of claim 1, wherein the control circuitry comprises one or more of: a camera for surveillance, a radio frequency identification device, a wireless networking device, a fire detector, a climate control device, an entry/exit control device, a smoke detector, a speaker, and a microphone.

11. The device of claim 1, further comprising at least one ambient sensor measuring at least one property of ambient conditions, the at least one property comprising one or more of: a presence of smoke, an ambient light level, a motion threshold, a vibration level, and an ambient temperature.

12. The device of claim 1, wherein to detect the emitted intensity of the light source, the at least one sensor at least measures a luminance level of the light source.

13. The device of claim 1, wherein the control circuitry comprises:
   a programmable control device;
   memory operatively coupled to the programmable control device and storing executable data and detected data; and
   a communication device coupled to the programmable control device and communicating with a network.

14. The device of claim 1, further comprising a backup power supply, the control circuitry operatively coupled to the backup power supply and switching from the power source to the backup power supply in response to a power failure of the power source.

15. The device of claim 1, wherein to adjust the emitted intensity of the light from the light source, the control circuitry is configured to adjust the emitted intensity based on (i) a change in ambient light conditions, (ii) a presence of smoke, (iii) an ambient temperature indicative of a fire, or (iv) a vibration level indicative of a disturbance.

16. The device of claim 1, wherein to control the emitted intensity of the light from the luminescent panel of the light source, the control circuitry is configured to adjust the power to the luminescent panel based on (a) a power outage, (b) a level of luminance extending a lifespan of the light source, or (c) a level of luminance minimizing power consumption.

17. The device of claim 1, wherein the illuminated safety device is an exit sign.

18. The device of claim 1, wherein the control circuitry monitors a condition associated with the device.

19. The device of claim 18, further comprising communication circuitry operatively coupled to the control circuitry and communicating the monitored condition from the control circuitry.

20. The device of claim 19, wherein the communication circuitry communicates the monitored condition wirelessly.

21. The device of claim 18, further comprising memory operatively coupled to the control circuitry and storing the monitored condition of the control circuitry.

22. An illuminated safety device for a facility, the device comprising:
   a light source having a luminescent panel emitting light;
   at least one sensor disposed adjacent the luminescent panel and detecting emitted intensity thereof; and
   communication circuitry communicating with a network; and
   control circuitry operatively coupled to the light source, the at least one sensor, and the communication circuitry, the control circuitry monitoring the emitted intensity detected by the at least one sensor and communicating the emitted intensity via the network with the communication circuitry.

23. A facility monitoring system, comprising:
- a plurality of illuminated safety devices distributed throughout the facility, each device having a light source and at least one sensor, the light source having a luminescent panel emitting light, the at least one sensor disposed adjacent the luminescent panel and detecting emitted intensity thereof, each device communicating data related to the emitted intensity via a communication link; and
- a control unit in communication with the plurality of devices via the communication link and receiving the communicated data related to the emitted intensity.

24. A facility safety method, comprising:
supplying power to a luminescent panel of an illuminated safety device in the facility;
emitting light with the luminescent panel of the device;
measuring emitted intensity of the luminescent panel with at least one sensor of the device; and
controlling the emitted intensity of the luminescent panel by adjusting the power to the luminescent panel of the device based on the measured intensity.

* * * * *